(12) United States Patent
Boesel

(10) Patent No.: US 7,742,978 B2
(45) Date of Patent: Jun. 22, 2010

(54) MULTI-TRANSACTION SYSTEM AND METHOD

(75) Inventor: Greg Boesel, Charlestown, MA (US)

(73) Assignee: Swaptree, Inc., Boston, MA (US)

( * ) Notice: Subject to any disclaimer, the term of this patent is extended or adjusted under 35 U.S.C. 154(b) by 213 days.

(21) Appl. No.: 11/733,986

(22) Filed: Apr. 11, 2007

(65) Prior Publication Data

US 2007/0244801 A1 Oct. 18, 2007

Related U.S. Application Data

(63) Continuation-in-part of application No. 11/279,782, filed on Apr. 14, 2006.

(51) Int. Cl.
*G06Q 40/00* (2006.01)

(52) U.S. Cl. .......................... 705/37; 705/38

(58) Field of Classification Search .............. 705/37–38
See application file for complete search history.

(56) References Cited

U.S. PATENT DOCUMENTS

| | | | |
|---|---|---|---|
| 5,500,793 A | 3/1996 | Deming, Jr. et al. | |
| 5,664,115 A | 9/1997 | Fraser | |
| 5,873,071 A | 2/1999 | Ferstenberg et al. | |
| 5,924,082 A | 7/1999 | Silverman et al. | |
| 6,026,374 A | 2/2000 | Chess | |
| 6,029,141 A | 2/2000 | Bezos et al. | |
| 6,035,288 A | 3/2000 | Solomon | |
| 6,049,783 A | 4/2000 | Segal et al. | |
| 6,058,378 A | 5/2000 | Clark et al. | |
| 6,058,379 A | 5/2000 | Odom et al. | |
| 6,061,656 A | 5/2000 | Pace | |
| 6,108,639 A | 8/2000 | Walker et al. | |
| 6,112,189 A | 8/2000 | Rickard et al. | |
| 6,185,558 B1 | 2/2001 | Bowman et al. | |
| 6,236,985 B1 | 5/2001 | Aggarwal et al. | |
| 6,401,080 B1 | 6/2002 | Bigus et al. | |
| 6,438,579 B1 | 8/2002 | Hosken | |
| 6,484,123 B2 | 11/2002 | Srivastava | |

(Continued)

FOREIGN PATENT DOCUMENTS

WO WO 01/24091 4/2001

(Continued)

OTHER PUBLICATIONS

Arrington, M., "Swaptree Update, First Screen Shots," http://www.techcrunch.com/2006/06/20/swaptree-update-first-screen-..., Jun. 22, 2006, p. 1-9.
Zunafish, http://www.zunafish.com, Apr. 24, 2006, (4 pp.).

*Primary Examiner*—Thu Thao Havan
(74) *Attorney, Agent, or Firm*—Mills & Onello, LLP; David M. Mello

(57) ABSTRACT

A multi-transaction system comprises a transaction module configured to access a set of transaction systems to obtain transaction information to enable procurement of an item. The set of transaction systems includes an automated trading system configured to enable a user to receive the item in a trade for at least one other item associated with the user, and further includes at least one of an auction system configured to enable the user to electronically bid on the item and an online sales system configured to enable the user to purchase the item. A method is provided for performing corresponding functions.

50 Claims, 9 Drawing Sheets

U.S. PATENT DOCUMENTS

| | | |
|---|---|---|
| 6,493,683 B1 | 12/2002 | David et al. |
| 6,529,905 B1 | 3/2003 | Bray et al. |
| 6,560,580 B1 | 5/2003 | Fraser et al. |
| 6,611,814 B1 | 8/2003 | Lee et al. |
| 6,721,743 B1 | 4/2004 | Sakakibara |
| 6,847,938 B1 | 1/2005 | Moore |
| 6,882,985 B1 | 4/2005 | Kay et al. |
| 6,993,500 B2 | 1/2006 | Ishihara |
| 7,058,598 B1 | 6/2006 | Chen et al. |
| 7,069,308 B2 | 6/2006 | Abrams |
| 7,165,045 B1 | 1/2007 | Kim-E |
| 7,283,994 B2 | 10/2007 | Heusermann |
| 2001/0034694 A1 | 10/2001 | Elias |
| 2002/0002527 A1 | 1/2002 | Holtzman |
| 2002/0032640 A1 | 3/2002 | LaFore et al. |
| 2002/0038278 A1 | 3/2002 | Himmelstein |
| 2002/0062249 A1 | 5/2002 | Iannacci |
| 2002/0073015 A1 | 6/2002 | Chan et al. |
| 2002/0087377 A1 | 7/2002 | Rajasenan et al. |
| 2002/0091624 A1 | 7/2002 | Glodjo et al. |
| 2002/0099519 A1 | 7/2002 | Srivastava |
| 2002/0107783 A1 | 8/2002 | La Mura et al. |
| 2002/0147640 A1 | 10/2002 | Daniele et al. |
| 2002/0161779 A1 | 10/2002 | Brierley et al. |
| 2003/0014351 A1 | 1/2003 | Neff et al. |
| 2003/0028884 A1 | 2/2003 | Swart et al. |
| 2003/0065598 A1 | 4/2003 | Bunda |
| 2003/0074273 A1 | 4/2003 | Miller et al. |
| 2003/0088497 A1 | 5/2003 | Belgrano |
| 2003/0088501 A1 | 5/2003 | Gilbert et al. |
| 2003/0112464 A1 | 6/2003 | Garcia et al. |
| 2003/0187779 A1 | 10/2003 | Han |
| 2003/0200169 A1 | 10/2003 | Freeny, Jr. |
| 2003/0236739 A1 | 12/2003 | Borgeson et al. |
| 2004/0049446 A1 | 3/2004 | Seljeseth |
| 2004/0059626 A1 | 3/2004 | Smallwood |
| 2004/0064395 A1 | 4/2004 | Mintz et al. |
| 2004/0158502 A1 | 8/2004 | Adams et al. |
| 2004/0172335 A1 | 9/2004 | Batoff |
| 2004/0177025 A1 | 9/2004 | Spoonhower et al. |
| 2004/0193530 A1 | 9/2004 | Hausman |
| 2004/0220884 A1 | 11/2004 | Khan |
| 2004/0230536 A1 | 11/2004 | Fung et al. |
| 2004/0266505 A1 | 12/2004 | Keam et al. |
| 2005/0021443 A1 | 1/2005 | Beard et al. |
| 2005/0027616 A1 | 2/2005 | Jones et al. |
| 2005/0108076 A1 | 5/2005 | Carrender et al. |
| 2005/0125273 A1 | 6/2005 | Simons et al. |
| 2005/0149428 A1 | 7/2005 | Gooch et al. |
| 2005/0165766 A1 | 7/2005 | Szabo |
| 2005/0171890 A1 | 8/2005 | Daley et al. |
| 2005/0197909 A1 | 9/2005 | Klenske |
| 2005/0234805 A1 | 10/2005 | Robertson et al. |
| 2005/0262000 A1 | 11/2005 | Sato |
| 2005/0278218 A1 | 12/2005 | Adams et al. |
| 2006/0026077 A1 | 2/2006 | Silverman et al. |
| 2006/0031177 A1 | 2/2006 | Rule |
| 2006/0036531 A1 | 2/2006 | Jackson et al. |
| 2006/0064409 A1 | 3/2006 | Hardwick |
| 2006/0080226 A1 | 4/2006 | Pickering |
| 2006/0080336 A1 | 4/2006 | Zhang et al. |
| 2006/0106859 A1 | 5/2006 | Eugene et al. |
| 2006/0116888 A1 | 6/2006 | Mayer et al. |
| 2006/0129441 A1 | 6/2006 | Yankovich et al. |
| 2006/0176271 A1 | 8/2006 | Polivy et al. |
| 2006/0224073 A1 | 10/2006 | Lin et al. |
| 2006/0238828 A1 | 10/2006 | Kanno et al. |
| 2007/0088652 A1 * | 4/2007 | Firmage et al. ............... 705/37 |
| 2007/0124228 A1 | 5/2007 | Elias et al. |
| 2007/0174448 A1 | 7/2007 | Ahuja et al. |

FOREIGN PATENT DOCUMENTS

| | | |
|---|---|---|
| WO | WO 03/015885 | 2/2003 |
| WO | 2007/121298 A2 | 10/2007 |
| WO | 2007/121305 A2 | 10/2007 |

* cited by examiner

MULTI-TRANSACTION SYSTEM AND METHOD

CROSS REFERENCES TO RELATED APPLICATION

This application is a continuation-in-part of and claims priority under 35 U.S.C. §120 to co-pending, commonly owned U.S. non-provisional patent application Ser. No. 11/279,782, entitled AUTOMATED TRADING SYSTEM AND METHOD, filed Apr. 14, 2006.

TECHNICAL FIELD

This disclosure relates generally to trading systems and methods and, more particularly, to trading systems and methods that include some level of automation.

BACKGROUND

Many people readily acquire goods from multiple sources, such as, for example, large discount stores, malls, mail order catalogs, television shopping channels and internet sites. An increasing number of these sources can also utilize postal or other delivery services to deliver goods to customers. The increased availability of delivery-based shopping sources has generally increased consumers access to a wide variety of goods.

While consumers have experienced increased access to a variety of goods, there remains relatively limited options to dispose of unwanted goods. Over time people can accumulate goods that, for various reasons, they no longer want to possess. For example, a person may no longer need the use of a good, may no longer desire to keep a good, or may receive an unnecessary or redundant good as a gift. If a person no longer wants a good they must decide how to dispose of the unwanted good.

One method of disposing of an unwanted good may be to sell the good. A person may sell a good at a market for second-hand or used goods. Recently, some internet sites have allowed people to sell and buy used goods. Some internet sites allow the general public to view goods offered for sale and bid on the goods via an auction system. Such sites may benefit from large numbers of people viewing the goods offered for sale and potentially bidding on the goods.

Another method of disposing of unwanted goods may include trading the goods. In some instances a person may offer to trade a good to another person for a different good. Generally such trading requires that the people involved in the trade must come to an agreement regarding the respective values of the goods to be traded. Further, for a trade to occur between two people both should want a good offered for trade by the other person. Such trading between two people can be limiting as both people must receive goods the other person possesses and wants to trade.

Some internet sites have been developed to permit internet-based trades. Generally these sites have used a limited variety of different trading methods. For example, some sites used token, or other quasi-currency systems, to assign an arbitrary "value" to goods. Such systems generally allowed a person to set the value of their goods using a quasi-currency system offered by a site. A person may then participate in trades with other people using the quasi-currency system and trade for other goods based on the respective value of the goods. Trades for goods of different value often result in credits or debits to accounts held by the people participating in the trade.

Other internet sites provided trading systems utilizing negotiated trades. Such systems typically permit people to provide descriptions of their goods for trade. If Person B wished to trade for a good of Person A, Person B may read the description of Person A's good and then propose a trade based on the description of the good. Person A may then view Person B's list of goods for trade to determine if a suitable trade could be made. Additional negotiations between the two people may be required to complete the trade, such as, for example, including additional items or money in the trade to even up the value of the goods, requesting additional information about the goods, determining who pays for shipping the goods, insurance costs, etc.

These and other internet-based trading operations generally did not provide efficient or effective methods to trade unwanted goods. Some sites were complicated or difficult to use, often requiring people to value their goods or provide descriptions of their goods. Other sites often required people to spend long periods of time determining possible trades, selecting goods, negotiating trades or updating information.

SUMMARY OF THE DISCLOSURE

One aspect of the present disclosure is directed toward a multi-transaction system including a transaction module configured to access a set of transaction systems to obtain transaction information to enable procurement of an item. The set of transaction systems includes an automated trading system configured to enable a user to receive the item in a trade for at least one other item associated with the user, and at least one of an auction system configured to enable a user to electronically bid on the item, and an online sales system configured to enable the user to purchase the item.

Another aspect of the present disclosure is directed to a multi-transaction method that includes accessing a set of transaction systems to obtain transaction information for enabling procurement of an item by a user. The set of transaction systems includes an automated trading system configured to enable the user to receive the item in a trade for at least one other item associated with the user, and at least one of an auction system configured to enable the user to electronically bid on the item, and an online sales system configured to enable the user to purchase the item. The method also includes providing the transaction information to a user device configured to enable the user to procure the item from at least one transaction system from the set of transaction systems.

Another aspect of the present disclosure is directed to a computer program product including a computer readable medium having stored thereon computer executable instructions for performing a method including accessing a set of transaction systems to obtain transaction information for enabling procurement of an item by a user. The set of transaction systems including an automated trading system configured to enable the user to receive the item in a trade for at least one other item associated with the user. The computer program product further includes one or more of an online sales system configured to enable the user to purchase the item and an auction system configured to enable the user to electronically bid on the item. The method also includes providing the transaction information to a user device for enabling the user to procure the item from at least one transaction system from the set of transaction systems.

DETAILED DESCRIPTION

Figure 1:
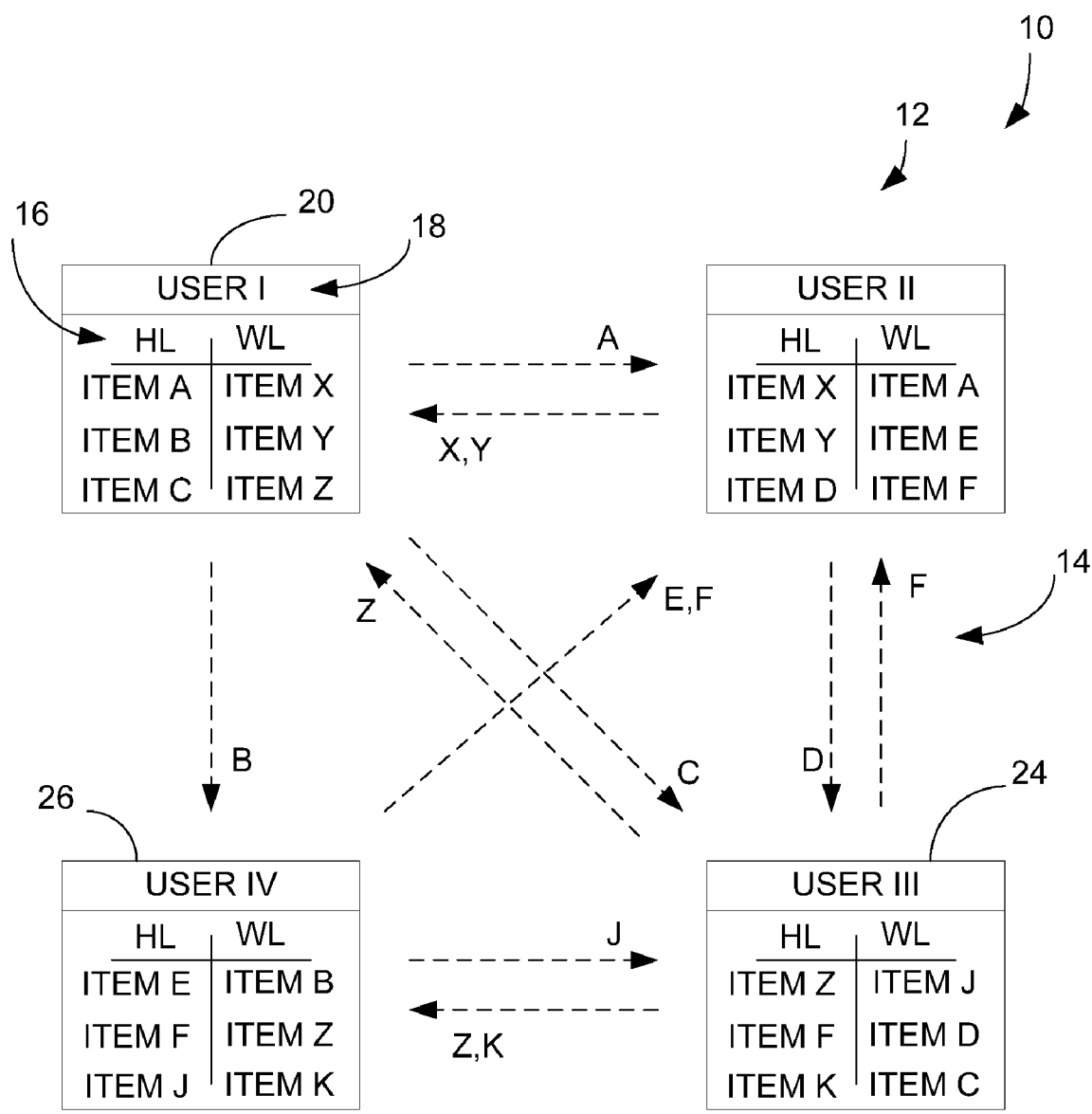
FIG. 1 illustrates a block diagram embodiment of a trading system, in accordance with aspects of the present invention.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Systems and methods according to various aspects of the present disclosure facilitate or enable automated exchanges of goods (generally referred to as "items" or "tradable items") among a set of users. As used herein, the term "automated" includes semi-automated and fully automated systems and methods. In some embodiments, an automated trade may include a non-currency trade, a non-negotiated trade, or both. Below are illustrative embodiments of such systems and methods. As will be appreciated by those skilled in the art, the present disclosure is not limited to the below illustrative embodiments, but can be implemented in a variety of embodiments not herein disclosed.

A user from the set of users may include any entity capable of making a trade, such as a person, a group of people, or an organization. In some embodiments a user could be an automated or programmed process configured to execute a trade. A group of people may include a family, a group of friends, a group of colleagues, members of a book club (or other club), alumni of an academic institution or any other group, whether related or unrelated. An organization may include a company, a business, an institution, a university, a non-profit organization, a department, an academic institution, a class, a hospital, a religious organization, a political party, a professional association, a governmental entity or any other organization.

In some embodiments, tradable items may include items of approximately similar value, but in other embodiments this may not be required. In some embodiments tradable items may include items having similar item properties, wherein item properties may include an item type or format, content type, condition, identifier—as just a few possible examples.

Item type may refer to one or more tangible forms or formats of an item, such as, for example, a book, a magazine, a compact disc (CD), a digital video disc (DVD), or other types of tangible expressions of content. It may also refer to an electronic file type, such as MPEG, JPEG, PDF, DOC, TIF and so on. In various embodiments, item type may also include classifications or sub-classifications of items, such as, for example, a hard-cover book, a soft-cover book, an audio book, an antique book, an out-of-print book, video games, application software, and so on. The item type could refer to other types of tangible objects or property, such as one or more of musical instruments, sporting goods equipment, art (or other collectibles), trading cards, clothes, vehicles, animals, computers, equipment, furniture or other personal property, as other examples.

In some embodiments, tradable items may include a special item, i.e., having a certain status relative to other items, wherein the special item may include items of higher or lower value than other tradable items. For example, special items may include a collection, such as, for example, a CD box set, a book series, a DVD box set, one or more collectible items, and so on. Special items may also include limited-editions, one-of-a-kind, autographed, event related items, rare items, or promotional items, as examples.

It is contemplated that item content may include any of a variety of content types or forms, such as text, an image (e.g., a picture, drawing, painting, and the like), an audio recording, a visual recording, an audio-visual recording, computer software (e.g., a game or software application), or any combination thereof, or other known types of content. Item content may additionally or alternatively, include indicia referring to whether the content is restricted, limited or rated content, such as adult only, G-Rated, and so on.

Item condition may refer to a condition of an item such as, for example, excellent, very good, good, average, poor, new, used, damaged, small, medium, large, and so on.

In some embodiments, items may be associated with one or more item identifiers. For example, an item identifier may include a title, an author's or artist's name or pseudonym, a name of a group, a date, a volume number, a series number, an international standard book number (ISBN), a universal product code (UPC), a CD number, a DVD number, or other information associated with the item that distinguishes it individually or as being part of a certain class of items or genre. In some embodiments an identifier may be assigned by an automated trading system.

In some embodiments, an automated trading system may be configured to determine a trade of one or more items based on one or more properties of the items. For example, such a trading system may determine or identify a proposed or possible trade of items based on similar item type wherein a DVD may be traded for a DVD, a CD may be traded for a CD, a DVD box set may be traded for a DVD box set, and so on. The trading system may also determine a trade of items based on different item type, wherein a book may be traded for a CD, a DVD may be traded for a CD, and so on. In addition, the trading system may determine one or more trades of a plurality of items. For example, a book and a CD may be traded for two DVDs, six CDs may be traded for a CD box set, four magazines may be traded for a book, and so on. In various embodiments the automated trading system may facilitate any combination of the above trading scenarios.

Figure 2A:
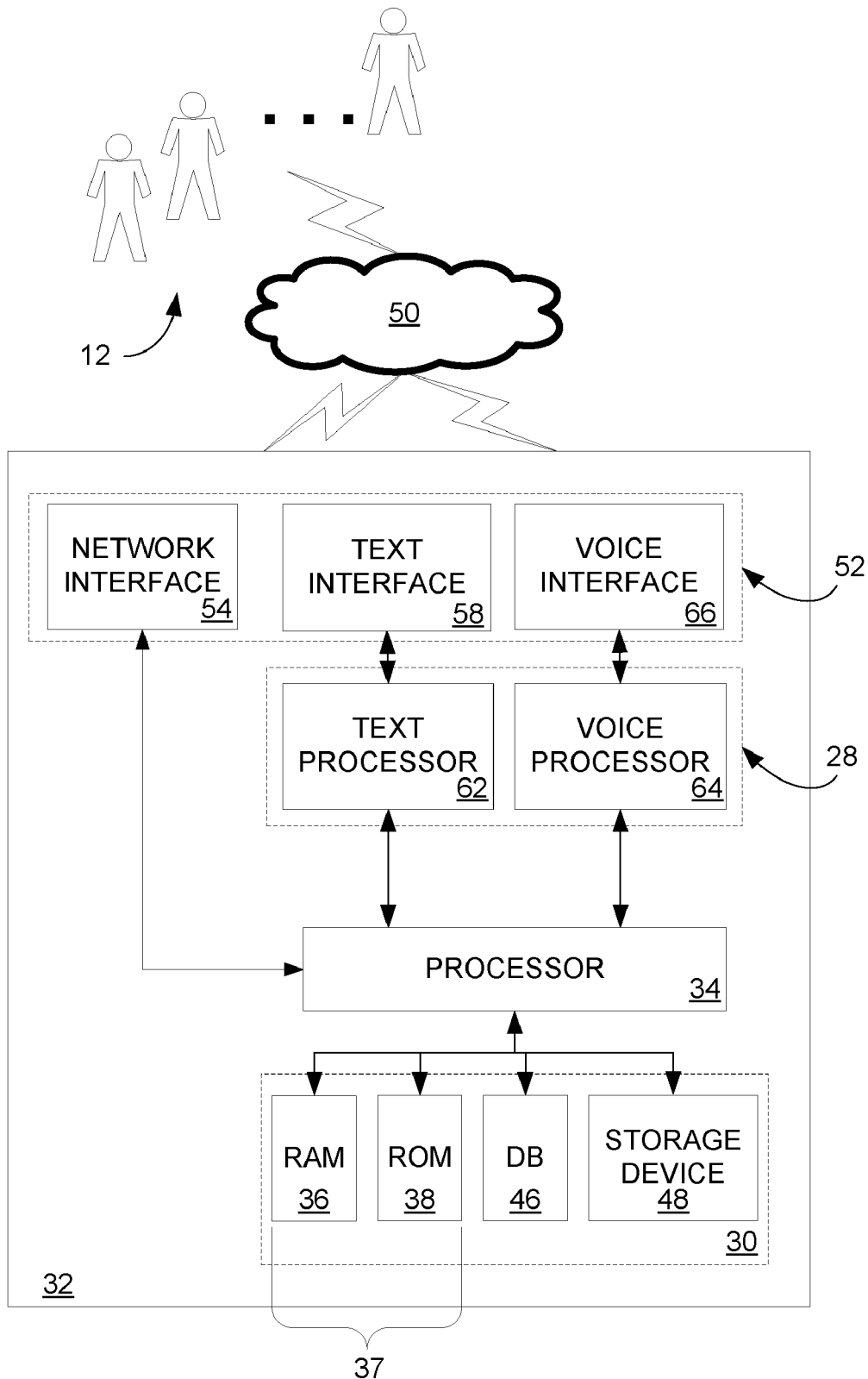
FIG. 2A illustrates a block diagram embodiment of a computer system, in accordance with aspects of the present invention.
Figure 2B:
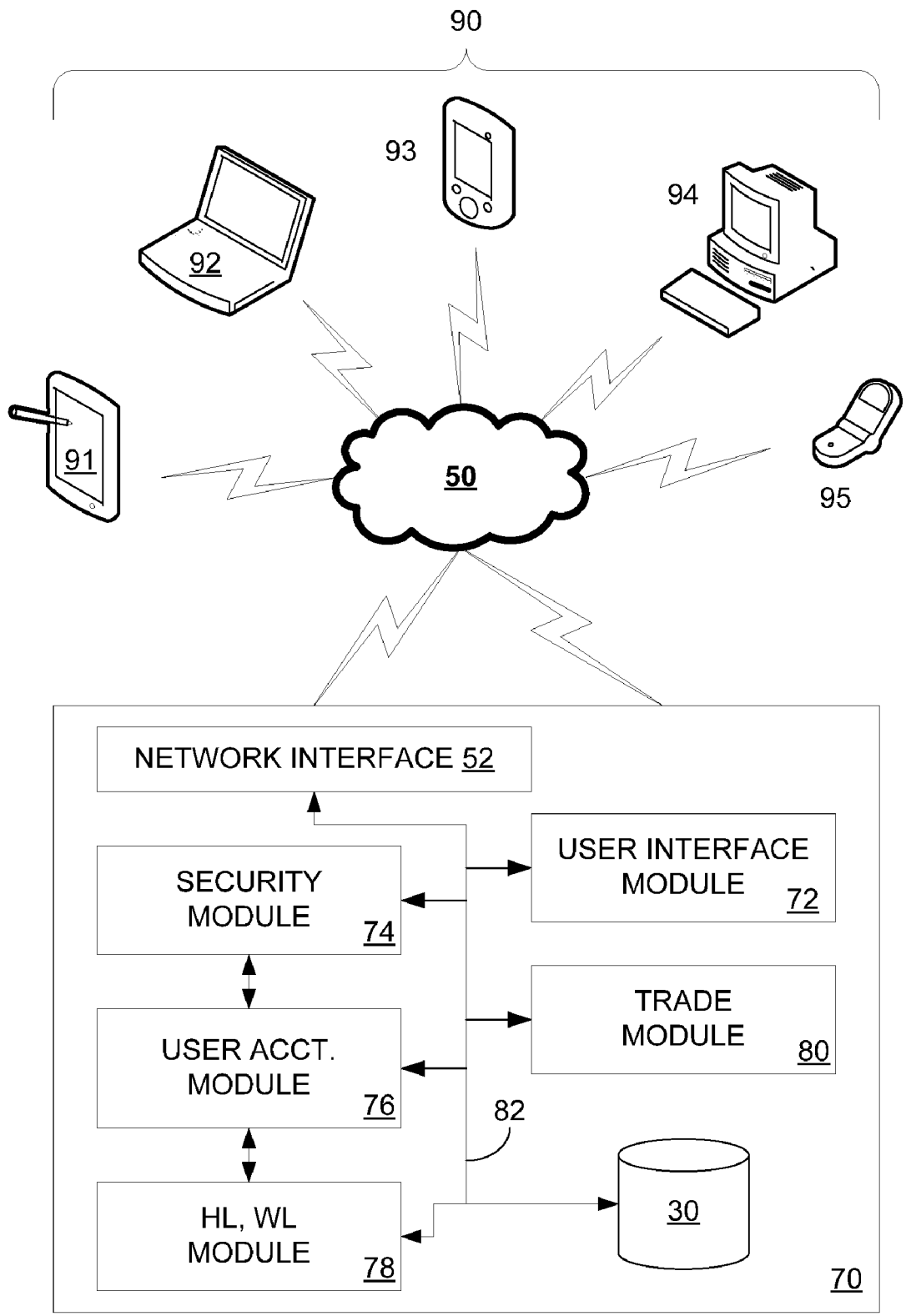
FIG. 2B illustrates a block diagram embodiment of a set of functional modules that may be executed using the computer system of FIG. 2A.

FIG. 1 is a representative block diagram 10 of possible interactions among a plurality of users 12 within the context of an automated trading system (see, for example, FIG. 2A and FIG. 2B). Through such interactions, a user may, for example, exchange one or more items the user has for one or more items the user wants that are available from one or more other users from users 12.

In the illustrative embodiment of FIG. 1, the plurality of users 12 includes a User I 20, a User II 22, a User III 24, and a User IV 26. Associated with each of these users may be a list 15, including a list of "haves" (e.g., a have list or "HL" 16) and a list of "wants" (e.g., a want list or "WL" 18). As is shown in FIG. 1, User I 20 has an HL comprising Items A, B, and C and a WL comprising Items X, Y, and Z. User II 22 has an HL comprising Items X, Y, and D and a WL comprising Items A, E, and F. User III 24 has an HL comprising Items Z, F, and K and a WL comprising Items J, D, and C. User IV 26 has an HL comprising Items E, F, and J and a WL comprising Items B, Z, and K. Each of these items is potentially eligible for a trade.

An automated trading system may be configured to determine at least one trade based on items listed in the HLs and WLs of the plurality of users 12. For example, the automated trading system may be configured to determine a two-way trade, wherein items may be traded between two users from the plurality of users 12 based on the HL and WL of each of the two users. As shown in FIG. 1, the automated trading system may identify or determine a two-way trade between User I 20 and User II 22, wherein User I 20 and User II 22 may trade Item A and Item X. For example, the automated trading system may determine that the HL of User I 20 includes Item A and the WL of User II 22 includes Item A. The trading system may also determine that the WL of User I 20 includes Item X and the HL of User II 22 includes Item X. The trading system may then facilitate or identify a trade between User I 20 and User II 22 whereby User I 20 may trade Item A to User II 22 in exchange for Item X. In FIG. 1 a trade is indicated by a dashed ray showing the direction of actual or proposed movement of an item from an HL or WL of one user to another user, along with an identification of the item (e.g., "A" for Item A).

Additionally, the automated trading system may be configured to determine an "N-way" trade, wherein a trade may involve more than two users and tradable items. In such embodiments N refers to the number of users participating in a trade, from the plurality of users. There is no inherent limit on the number of users that may be involved in a trade. For example, the automated trading system may be configured to determine a four-way trade, where N equals four, so involves four users.

As shown in FIG. 1, trading system may determine that User I 20 could trade Item B to User IV 26, User IV 26 could trade Item J to User III 24, User III 24 could trade Item F to User II 22, and User II 22 could trade Item Y to User I 20. This exemplary trade includes four users from the plurality of users 12, whereby four items are traded (or identified for a trade) based on the HLs and WLs of the four users. As another example shown in FIG. 1, the system may facilitate a three-way trade whereby User II 22 trades Item X and Item Y to User I 20, User I 20 trades Item A to User II 22 and trades Item B to User IV 26, and User IV 26 trades Item E to User II. Thus, it is not necessary that trades include one item for only one other item.

FIG. 2A is an exemplary block diagram of a computer architecture or system 32 within which an automated trading system (see FIG. 2B) may be implemented. The computer system 32 includes at least one processor 34 (e.g., a central processing unit (CPU)) that stores and retrieves data from an electronic information (e.g., data) storage system 30. As will be appreciated by those skilled in the art, while computer system 32 is shown with a specific set of components, various embodiments may not require all of these components and could include more than one of the components that are included, e.g., multiple processors. It is understood that the type, number and connections among and between the listed components are exemplary only and not intended to be limiting.

In the illustrative embodiment, processor 34 is referred to as CPU 34, which may include any of a variety of types of processors known in the art (or developed hereafter), such as a general purpose microprocessor, a digital signal processor or a microcontroller, or a combination thereof. CPU 34 may be operably coupled to storage systems 30 and configured to execute sequences of computer program instructions to perform various processes and functions associated with the automated trading system, including the storing, processing, formatting, manipulation and analysis of data associated with the automated trading system (e.g., user data, HL data, and WL data). The computer program instructions may be loaded into any one or more of the storage media depicted in storage system 30. One illustrative embodiment of functional modules embodying such computer program instructions is provided in FIG. 2B.

Storage system 30 may include any of a variety of semiconductor memories 37, such as, for example, random-access memory (RAM) 36, read-only memory (ROM) 38, a flash memory (not shown), or a memory card (not shown). The storage system 30 may also include at least one database 46, at least one storage device or system 48, or a combination thereof. Storage device 48 may include any type of mass storage media configured to store information and instructions that processor 34 may need to perform processes and functions associated with the automated trading system. As examples, data storage device 48 may include a disk storage system or a tape storage system. A disk storage system may include an optical or magnetic storage media, including, but not limited to a floppy drive, a zip drive, a hard drive, a "thumb" drive, a read/write CD ROM or other type of storage system or device. A tape storage system may include a magnetic, a physical, or other type of tape system.

While the embodiment of FIG. 2A shows the various storage devices collocated, they need not be as they could be remote to each other, to processor 34 or both. Storage system 30 may be maintained by a third party, may include any type of commercial or customized database 46, and may include one or more tools for analyzing data or other information contained therein.

In various embodiments, data storage system 30 may be configured to store data representative of the users 12, items 14, or both. Data representative of users 12 may include data that is not specific to the automated trading system, such as a name, a delivery address, a zip code, a credit card number, a social security number, a phone number, an email address, or a combination thereof, as examples. Data representative of a user may include data associated with the user and the automated trading system, such as, for example, a username, a password, item list 15 (see FIG. 1), HL 16, WL 18, a trade history, a user rating or ranking, a user comment, a trading group, an average response time, an accept/reject trade percentage, a member or account number, an access code, and so on. Data representative of items 14 may include data associated with one or more item properties.

As an example, database 46 may include any hardware, software, or firmware, or any combination thereof, configured to store data. Specifically, database 46 may be configured to store data and information representative of one or more of the plurality of users 12, one or more of items 14, or both. In some embodiments, database 46 may include one or more fields, wherein a field may be an element of a database record in which one piece of information may be stored. In particular, a field may be configured to store an element of data representative of one or more of the users 12, one or more of items 14, or both.

In some embodiments, one or more storage device in the data storage system 30 (e.g., database 46) may be configured to store a "trade leg" (TL), a trade table, or other data associated with the automated trading system. The term "trade leg" as used herein means a trade interaction, such as the movement of Item A from User I to User II in FIG. 1. A trade table may take the form, in some embodiments, of a matrix that logs information related to or derived from potential, proposed or actual trades, including trade legs. Data associated with the trading system may be stored in storage system 30 using any suitable database format, such as, for example, a relational database, a hierarchical database, or any suitable schema. Data storage system 30 may be configured to store information in a format configured to enhance operations of CPU 34 or other functions of the automated trading system.

To illustrate TLs with an example as shown in FIG. 1, TLs between User I 20, User II 22, User III 24 and User IV 26 may include the following thirteen TLs shown in Table 1 below:

TABLE 1

| User I | → | User II with Item A |
|--------|---|---------------------|
| User I | → | User III with Item C |
| User I | → | User IV with Item B |
| User II | → | User I with Item X |
| User II | → | User I with Item Y |
| User II | → | User III with Item D |
| User III | → | User I with Item Z |
| User III | → | User II with Item F |
| User III | → | User IV with Item Z |
| User III | → | User IV with Item K |
| User IV | → | User II with Item E |
| User IV | → | User II with Item F |
| User IV | → | User III with Item J |

Computer system 32 may include or interface with one or more security systems (not shown), configured to at least partially restrict or control access to one or more components of computer system 32. Security systems may include hardware, software, firmware or a combination thereof, such as, for example, a firewall, password protection software, user authentication software, encryption software and the like. In some embodiments, security systems may be configured to limit a function of the trading system, limit access to data associated with trading system, or both. Security systems may be configured to limit trading of certain items 14 by certain ones of the users 12, such as, for example, children. In some embodiments, computer system 32 may be configured so that select data contained within storage system 30 may be inaccessible to one or more of the users 12. Computer system 32 may also be configured to permit trading of items 14 only between select users from the plurality of users 12, such as, for example, between users attending the same school, users in the same city or geographic vicinity, users that are part of the same or aligned organizations, users above a certain age, users with certain access privileges, or any combination thereof, as examples.

Computer system 32 may include a network interface system or subsystem 54 configured to enable trade-related interactions with the plurality of users 12 via one or more network 50. As such, computer system 32 may be configured to transmit or receive, or both, one or more signals related to the functions of the automated trading system. A signal may include any generated and transmitted communication, such as, for example, a digital signal or an analogue signal. As examples, network 50 may be a local area network (LAN), wide area network (WAN), virtual private network (VPN), the World Wide Web, the Internet, voice over IP (VOIP) network, a telephone or cellular telephone network or any combination thereof. The communication of signals across network 50 may include any wired or wireless transmission paths.

To enable communications via network 50, computer system 32 may include a set of interfaces 52 and a set of processors 28, 34. The set of processors 28 may include a text processor 62 and a voice processor 64, along with CPU 34. The set of interfaces may include a network interface 54, a text interface 58 and a voice interface 66, as shown in this embodiment. As mentioned above, network 50 may represent a combination of networks configured to transmit and receive communications with computer system 32, via any of the set of interfaces 52.

CPU 34 may be operably coupled to network interface system 54 for exchanging typical computer network information, e.g., via the Internet, a LAN, WAN, VPN or some combination thereof. Network interface system 54 may be configured to permit communication between and among the users 12 and computer system 32, for example using an Internet protocol (IP) or other network-based protocol. In such cases, network interface system 54 may be configured to utilize TCP/IP, HTTP, DNS or any other application, transport, network, or link protocol, or combination of the foregoing.

Text interface 58 may be operably coupled to a text processor 62 configured to process received text message and text messages to be transmitted. Text interface 58 may be configured to permit text-based communication between users 12 and computer system 32. For example, in combination, text interface 58 and text processor 62 may include functionality to communicate with a two-way pager, a personal digital assistant (PDA), a cell phone, a computer, a laptop, a tablet, a terminal, or any other suitable electronic device, whether wired or wireless. Text processor 62 may include an email system configured to transmit, receive, or process, email messages or a combination thereof. Text processor 62 may also include an instant-messaging (IM) system, a two-way paging system or other system configured to transmit, receive, or process, or a combination thereof, text-based information. As will be appreciated by those skilled in the art, such systems may also provided mechanisms for transferring files between devices. Such files may include any of a wide variety of content.

Voice interface 66 may be operably coupled to a voice processor 64 configured to process received voice information and voice data to be transmitted. Voice interface 66 may be configured to permit voice-based communication between and among the users 12 and computer system 32. For example, in combination, voice interface 66 and voice processor 64 may be configured to enable interaction with a cell phone, a fixed-line telephone, a VOIP device or other similar device, or combinations thereof. For example, voice interface 66 may be configured to transmit, receive, or both digital or analogue signals using wired to wireless communications devices and systems, such systems may include telephone, cellular telephone and VOIP systems, as examples.

In some embodiments, the operable connections between components of computer system 32 may be other than as shown in FIG. 2A. For example, data storage system 30 may be operably connected to communication processors 28 or interfaces 52, or both, such that users from the plurality of users 12 may modify data stored in data storage system 30 using such interfaces and processors.

In various embodiments, systems that may be associated with the automated trading system may include one or more systems configured to provide additional functions associated or useful in conjunction with the trading system. For example, systems associated with the trading system may include a tracking system (not shown) configured to track the transport of traded items, a postage system (not shown) configured to provide postage services for shipping traded items, a routing system configured to route and re-route traded items, or other suitable systems. Computer system 32 may be configured to transmit one or more signals to one or more systems associated with the trading system. For example, a system associated with the trading system may be configured to receive a signal transmitted by computer system 32 wherein the signal may affect a function of the system associated with the automated trading system.

It is also contemplated that trading system may be implemented using one or more computer systems 32. For example, various embodiments of an automated trading system may include a plurality of computer systems 32, components of computer system 32, or other systems associated with the trading system. A large number of users 12, heavy trading, or complex computations may require relatively high computational power to efficiently operate the trading system. It is also contemplated that one or more automated trading system may be configured to operate independently of other trading systems based on a language, an organization, an age of users, a geographic location, or other requirement.

FIG. 2B is a block diagram of an embodiment of an automated trading system 70 that may be implemented using the computer system 32, as an example. Trading system 70 can include a variety of functional modules that communicate via a communication path 82, (e.g., a bus or a network). Trading system 70, as discussed with respect to FIG. 2A, may communicate with a set of users (e.g., users 12 from FIG. 1) via network 50. In various embodiments, the users may access the automated trading system using any of a variety of wired or wireless devices 90. Such devices may include an electronic tablet 91, laptop computer 92, a PDA 93, a personal computer 94 or a cell phone 95, as examples.

Automated traded system 70 may include a user interface module 72 that may be configured to prepare information or content to be output via any of devices 90. Such information or content may be configured to be provided within a browser or window environment, and could include, as example, text, graphics, video, audio or the like. More specifically, information presented on the devices 90 may include information representing users, items 14 from HLs and WLs of the users 12 (or the HLs and WLs themselves), information related to a previous, proposed or possible trade, or other information associated with the automated trading system. User interface module 72 may also prepare information received via network interface 52 for use by the other modules of the trading system 70.

A security module 74 may be included if access to trading system 70 and databases 30 are to be protected. As examples, security module 74 may include functionality to authenticate a user before allowing such access, such as by logging in using password protection. A user account module 76 may be included to permit the setup and management of user accounts, which may be stored in database 30. A user account may include information identifying the user, such as name, address, e-mail address and so on. Also associated with each user and its user account may be trade related information, such as have lists and want lists. In various embodiments, an HL, WL module 78 may be included for enabling users to define at least one have list and at least one want list. HL, WL module 78 may also maintain and update the HLs and WLs in database 30 in response to trades or user edits.

A trade module 80 is also included that provides the primary functions associated with identifying, coordinating and executing trades. To do so, trade module 80 accesses the HLs and WLs of various users in database 30 and searches for synergistic matches among such lists among the users. For example, for a given user (which may be a logged in user) and an identified item that the user wants, trade module 80 may search the have lists of other user in database 30 to determine which of the users has the identified item. As a result the trade module may identify one or more 2-way or N-way trades that could get the user the identified item, in exchange for at least one item on the user's want list.

Trade module 80 may present the potential 2-way or N-way trade items, e.g., graphically on a computer screen. In any event, trade module 80 may also present, or make accessible, item properties (e.g., new, used, damaged). In providing such information, automated trading system 70 may allow the user to select the most desirable trade for execution. Trade module 80 may also include functionality that requires each user to assent to the trade before it is executed. In some embodiments, trade module 80 may include functionality for generating signals embodying notices to users of a proposed trade involving one or more items from that user's have list or want list, e.g., an e-mail, phone call, and so on. The trade module may also be configured to provide a user a list of possible trades for items on the user's have list, i.e., showing what the user could get (even if not on the user's want list) for what the user has.

In generating lists of possible trades, the trade module 80 may determine a set of trade legs (TLs), trade tables or other information related to such possible trades, as discussed above with respect to FIG. 1. As will be appreciated by those skilled in the art, the modules present in FIG. 2B are merely illustrative. Other embodiments could use different modules that implement the disclosed functions in other manners, or could combine modules shown.

Figure 3:
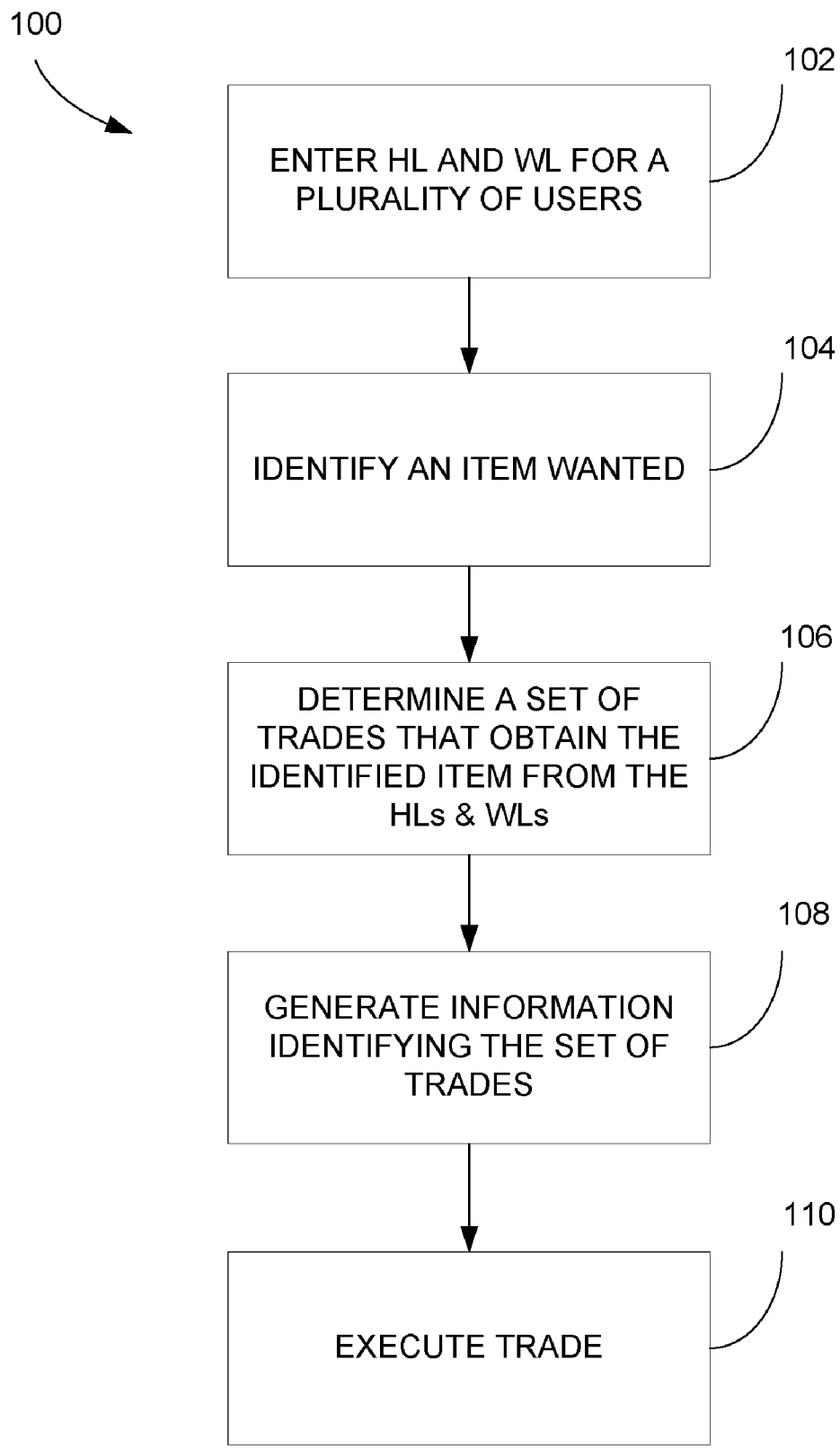
FIG. 3 illustrates a flowchart embodiment of an automated trading method, in accordance with aspects of the present invention.

FIG. 3 illustrates a flowchart 100 of an automated trading method according to one embodiment. Those skilled in the art will appreciate that the present disclosure is not limited to the method of FIG. 3. Flowchart 100 represents an automated method for trading one or more items 14 among a plurality of users 12 (see FIG. 1), for example, using automated trading system 70 of FIG. 2B. Method 100 may be used to determine, propose and execute one or more automated trades. In some embodiments, such trades may be determined based on data representative of users 12, data representative of items 14, or of both. Communication between the users and the automated trading system may be accomplished using any of the previously mentioned devices, networks, protocols and so on.

According to the method of FIG. 3, in a first step 102 have lists and want lists for a plurality of users 12 are entered into a database, for access in determining, proposing and executing automated trades. In step 104, an item is identified, as an item wanted by a user (or requesting user), i.e., to be obtained via a trade. In step 106, a determination of a set of possible trades is made. The set of possible trades may include 2-way trades, N-way trades, or a combination thereof, as discussed with respect to FIG. 1. Each of the possible trades provides a path for the requesting the user to obtain the identified item by giving up at least one item from the requesting user's have list. Therefore, to determine a possible trade, the requesting user has something on its have list that appears on at least one other user's want list. Once the set of possible trades is determined, it is communicated to the requesting user, e.g., by the transmission of a set of signals to a user device, wherein such signals embody information representing the set of possible trades. In step 110, the trade is executed. Execution may require the assent of at least one of the users involved in the trade, if not all.

Using the computer system 32 and automated trading system 70 as examples, a series of trade-related communications between users 12 and automated trading system 70 will be described by way of example. In order for a user to gain access, trading system 70 may be configured such that the user must provide a form of identification or access code to authenticate access. It is also contemplated that trading system 70 may be configured to determine an identity of user using other methods, such as, for example, using browser cookies, personal information associated with a cell phone, or other methods known in the art. Submission of appropriate data may allow the user to access trading system 70.

Following the user gaining access, the user may then access data representative of itself, its listed items, trade history and so on. Such data may be stored using storage systems 30 and associated with a user account. Using trading system 70, the user may also be able to view, add, delete and edit data associated with it or its account. For example, the user may add or remove items 14 from its HL 16, WL 18, or both (see FIG. 1). If the user accesses trading system 70 via network interface 54, the system may be configured to permit the user to add items to its HL, WL or both using a graphical user interface (GUI) browser. The updated data associated with the user may then be stored using storage system 30. It is also contemplated that additional, fewer or different steps may be conducted when the user accesses trading system 70 for the first time, e.g., for account setup, or initial generation of the user's HL, WL or both.

In some embodiments, automated trading may include non-currency trading, non-negotiated trading, or both. Non-currency trading may include trading that does not require a net transfer of currency between users participating in a trade. But, in some embodiments, trading system 70 may include membership fees, postage fees, or other currency transfers between trading system 70 and the users. Currency may include cash, credit, debt, bonds, stock, options, or other financial valuations of item. Currency may also include quasi-currency, such as a token or other proprietary currency used to represent the worth of items.

Non-negotiated trading may include trading that does not require a negotiation between users participating in a trade. Traditional forms of trading often require negotiation, bargaining, or other forms of communication between trade participants. Generally, a trade would only be agreed to upon the satisfaction of all trade participants, the basis of the agreement would often be the values of the items being exchanged. In non-negotiated trading, the users involved in a possible trade do not interact to determine values of items associated with the trade. In fact, the users may be prevented from interacting, except for post-trade execution transfer of the traded items. Non-negotiated trading can alleviate a significant amount of anxiety associated with bartering and expedite the trade significantly. Thus, non-negotiated trading tends to entice more users to trade and to make those trades much more efficient.

In some embodiments, method 100 may include determining or identifying one or more trades based on one or more trade-legs. For example, a TL may include data representative of a one-way transfer of an item between a first user and a second user, as is discussed with respect to FIG. 1. In some embodiments, the method may include determining a TL based on items listed in the HL, WL or both of users involved. For example, a TL may represent an item and two users, wherein a first user may have the item listed on its HL and the second user may have the same item listed in its WL. FIG. 1 and its associated text discusses possible trades, and their trade legs.

In some embodiments, method 100 may include determining one or more automated trades based on a trade table. The trade table may implement any suitable data format, wherein data associated with trading system 70 may be stored in multi-dimensional format, such as, for example, a two-dimensional matrix. The trade table in the two-dimensional matrix format may include data representative of one or more items listed in one or more columns and rows. In some embodiments, the trade table may include a header row containing a list of items, wherein one or more of the cells of the header row may contain one item. In some embodiments, the trade table may also include a first column containing a list of items, wherein each cell of the first column may contain at least one item. Further, the cells of the trade table may include data representative of one or more users, wherein each cell may include at least one have or want item corresponding to one of items listed in the header row, one of items listed in the first column, or both.

Method 100 may also determine an automated trade based on a recommendation system, such as, for example, a collaborative filter, a recommendation engine, a neural network, or other suitable computational method. A recommendation system may include hardware, software, firmware or a combination thereof configured to determine a recommendation based on data associated with trading system 70, and may be included as part of the system. For example, an item may be recommended to a user from the plurality of users 12 based on the user's HL, WL, a trade history, or other data associated with that user. It is also contemplated that if the user has no items listed in its WL, automated trading system 70 may recommend an item based on the user's HL or trade history. For example, trading system 70 may recommend an unlisted book by the same author as a book listed in the user's HL, an unlisted movie of similar genre to a previously traded movie, an unlisted CD by an artist listed in the user's HL, and so on.

Method 100 of FIG. 3 may include determining a trade with certain time-related parameters. For example, the automated system 70 may be configured to determine an automated trade in real-time, or near real-time. In some embodiments, real-time may include any time during a user's browsing session. Real-time may also include any time less than some predetermined threshold, e.g., ten minutes, and more typically, shorter times, such as sixty seconds or less. It is also contemplated that automated system 70 may be configured to determine an automated trade when a user is not logged into the automated trade system 70 or when the number of users accessing trading system 70 is below a threshold number of users.

Following the determination of one or more possible automated trades, method 100 may include transmitting one or more signals, as in step 108. A signal transmitted by automated trading system 70 may contain any data associated with the trade, users, items, or trading system 70. As previously described, the automated trading system may be configured to transmit signals via communication processors and interfaces 52, 28, 34 (see FIG. 2A). Specifically, the CPU 34 and communication processors 28 may generate signals for transmission via interfaces 52. For example, the signals may be transmitted to interfaces 52 such that users from the plurality of users participating in a trade may be notified of the trade, or possible trades.

In some embodiments, the signals may be transmitted based on data representing an at least partially automated trade. For example, signals may contain data representative of items to be traded and a delivery address to which a trade item is to be sent. The signals may also contain information representative of items to be received, such as, for example, an item title, condition, identifier, genre and so on, a rating of the user sending the item, a geographic location from where the traded item was or is being shipped, or other useful or suitable information. It is also contemplated that the signals may include a request for user input, such as, for example, a request for a user to accept or decline a trade.

In some embodiments, method 100 of FIG. 3 may include transmitting signals to one or more systems associated with trading system 70. For example, automated trading system 70 may be configured to transmit one or more signals to a tracking system, a postage system, a shipping system, a system of an organization or other system. Specifically, signals may be transmitted to a tracking system to initiate tracking of traded items. It is also contemplated that signals may be transmitted to a postage or shipping system such that a user sending a traded item may be provided with a delivery address.

In some embodiments, method 100 of FIG. 3 may include transmitting one or more signals based on information received from users from the plurality of users 12 and one or more systems associated with automated trading system 70. For example, automated trading system 70 may determine if one or more users from the plurality of users 12 have accepted or declined a proposed trade based on user input, as described above. If a proposed trade is declined by a user, automated trade system 70 may transmit a signal to cause data associated with the involved users and the proposed trade to be updated or recalculated to reflect the decline. Alternatively, if a proposed trade is accepted by the involved users, automated trading system 70 may transmit signals to cause data associated with the involved users to be generated or updated. For example, such signals could include or embody a notification to the users to ship their respective traded items, shipping labels could be provided to the users, and the shipping of the traded items could be tracked, and so on.

The present disclosure provides an automated trading system and method for trading one or more items between one or more users. Previous trading systems and methods were often complicated, time consuming, or difficult to use. The presently disclosed trading system and method may improve the ease-of-use, efficiency, or both of trading items.

The automated trading method and system presently disclosed may include non-negotiated trading wherein users may not be required to negotiate to transact a trade. For example, the users could either accept or decline a trade without any other required interaction, saving time and avoiding a lengthy bargaining process. Automated trading may also include non-currency trading, wherein items may be traded for other exchangeable items or items of similar value. Users may save time by not assigning a value to items they wish to trade and avoid the use of quasi-currency systems. Such quasi-currency systems are often problematic as they are restricted in use and people may be reluctant to trust the long-term worth of quasi-currencies.

In some embodiments, automated trading system 70 may be configured to optimize the number of traded items, the number of users, or both participating in a trade. As previously described, automated trading system 70 may be configured to determine one or more N-way trades, which could maximize the number of items to be traded between users.

Another advantage of the presently disclosed system and method may be the increased likelihood that users will participate in trades. The presently disclosed system may encourage a user to participate in a trade by displaying items available for trade in real-time. For example, automated trading system 70 may be configured to determine one or more trades when the user accesses the system, or at any time during the user's session. The user may add an item to its HL and the automated trading system 70 may then determine other items that the user may then receive in exchange for the newly added item. It is also contemplated that automated trading system 70 may display other items that the user could receive before adding a new item to its HL, even if other items are not in its WL.

Figure 4:
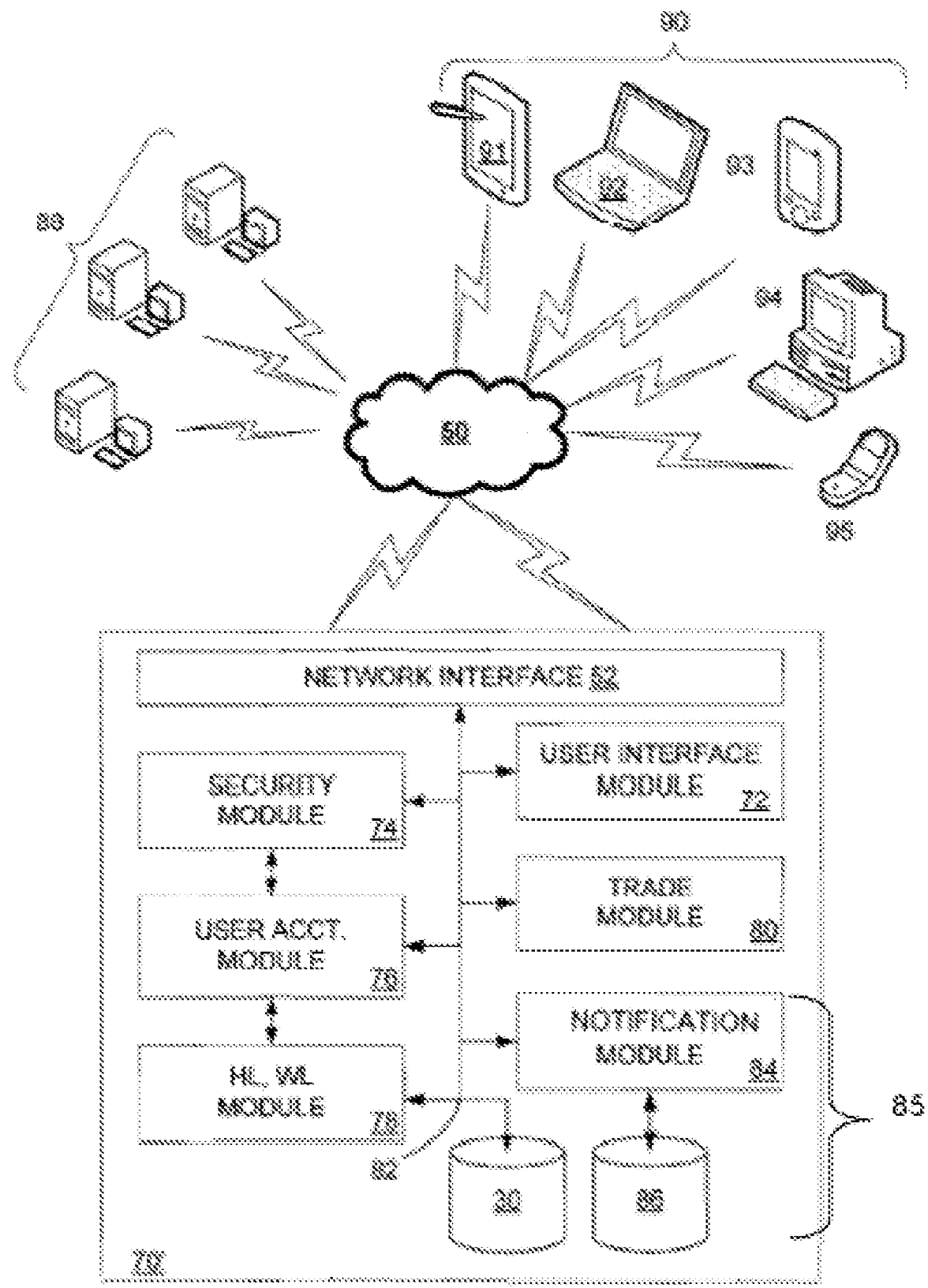
FIG. 4 illustrates a block diagram embodiment of a trading system with electronic notification functionality, in accordance with aspects of the present invention.

FIG. 4 shows yet another embodiment of an automated trading system 70'. Automated trading system 70' can include one or more components of automated trading system 70 and one or more components configured to provide electronic notification functionality, such as, for example, a notification module 84 and a notification database 86. Collectively, notification module 84 and notification database 86 can take the form of a notification system 85. In some embodiments, the notification system 85 can be subsumed within the automated trading system, as with automated trading system 70' in FIG. 4. In other embodiments, the notification system 85 can be a standalone system that links to a separate automated trading system, such as automated trading system 70 in FIG. 2B. In such a case, notification system 85 can perform notification functions on behalf of the automated trading system. In some embodiments, notification system 85 can interface to external systems 88 to provide notifications to user devices 90. For example, if a notification takes the form of an automated phone call, notification system 85 could place that call using a calling system from the external systems 88. Further, while shown as being separate in FIG. 4, in various embodiments, notification database 86 could be part of data storage system 30. A discussion of modules in automated trading system 70' that are common with those of automated trading system 70 in FIG. 2B is provided above, so omitted here for brevity.

Notification module 84 may communicate with one or more modules of automated trading system 70' to generate and output electronic notifications via network interface 52. The notifications generated may require notification module 84 to interact with other functional modules within automated trading system 70' and to obtain data from the other functional modules and from data storage system 30. Thus, network interface module 52 can provide a way to transmit the electronic notifications from automated trading system 70' (and notification system 85) to user devices 90 via network 50. User interface module 72 can provide formatting of notifications to be transmitted via the network interface module 52.

Notification module 84 can enable automated trading system 70' to provide electronic notifications within the context of, or in relation to, a user's trading experience. This can include notifications directly related to a trade, notifications related to the user's account (if any) or both, or notifications related to interactions by the user with automated trading system 70'. Notifications can take any of a variety of forms and can be provided in any of a variety of manners. Notifications can be provided via any digital or analog path or communication system or medium now known or hereafter developed, as depicted by network 50. Notifications can be presented within or through a browser, or other interface, through which the user interacts with the automated trading system. A user 12 can receive a notification via an electronic device from the set of user devices 90. As examples, a notification could be provided via one or more of an e-mail system, instant messaging system, text messaging system, a web browser, or a cell phone.

In an illustrative embodiment, notification module 84 provides the functional or processing capability and notification database 86 provides information, files, code, and data in support thereof. Notification module 84 can also be configured to access and use information and data from data storage system 30, which can include user data (e.g., HL and WL data, user account data, and so on) and data defining or relating to potential, pending, in-process, abandoned, or completed trades. Such information and data could include or be taken from trade legs and trade tables. Notification database 86 can also be used to record notifications sent to different users, e.g., to track outgoing notifications. Within database 86 and storage system 30, notifications can be logically associated in memory with the users (or the accounts of those users) involved in a trade or can be stored for other purposes. Associating a stored notification can be accomplished using customary database management techniques, such as using pointers for cross referencing the stored notification with the users involved in a trade to which the notification is related.

A notification can be generated automatically (as an automated notification) in response to any of a variety of types of stimuli. For example, a notification can be generated in response to a user action (e.g., an input) or inaction (e.g., failure to respond to a prompt), a new trade request, an abandoned trade, an addition, modification, or deletion of an item to or from a HL or WL, and an input, action or inaction of another user related to a potential, new, pending, in-process, abandoned, or completed trade. These are examples of a few user-related stimuli for notification generation.

There can also be system-related stimuli for generating a notification. For example, a notification can be generated and sent to a user in response to expiration of a time period by which a user's input or action was required, or as a prompt or reminder before the elapse of such period. A system-related stimulus could be a system generated alert or warning or a requirement for information or a user action. The system could also prompt the user for information needed to create or maintain a user account, based on internal system stimuli. The system could also stimulate the notification module 84 to send notifications to encourage a user to use of automated trading system, particularly if a significant amount of time has elapsed since the user's last interaction with the system. Many such examples are possible and not inherently bounded. These examples are not intended to be exhaustive, but are rather representative of some types of possible stimuli and notifications.

As examples, a notification can do any one or more of the following: (1) inform a user that an item on that user's HL or WL is involved in a proposed trade; (2) solicit the user's acceptance or rejection of a proposed trade; (3) inform the user that something on their WL is available for a trade; (4) inform the user that a proposed trade has been accepted or rejected; (5) inform the user that the automated trading system has received a rating or ranking of the user; (6) inform the user that a traded item has been delivered; (7) solicit the user's response to a question; (8) prompt the user to input or update information; (9) inform the user of an upcoming event, deadline or promotion; and (10) provide warnings and alerts to the user. The notification module 84 can, therefore, be configured to generate any of the foregoing notifications, or other notifications that are appropriate in relation to a trade, the user's account or the system. The notification can include any of a variety of types of information, data, objects, links, or code, as appropriate for the form, context, and content requirements of the notification.

The notification database 86 can include a set of notification templates, information, data and code used by the notification module 84 to generate the notifications. Such templates can take the form of pre-formatted user interface screens, or code to generate such screens, with a set of pre-defined fields that can be populated with information and data to achieve the objective of the notification. Such predefined fields may include fields associated with user related information, item related information, or any other suitable information required to transact a trade. A notification can comprise or take the form of formatted or unformatted text, an image, a script, an HTML or XML document, audio, video, or a combination thereof, as examples. Any of the foregoing can be embodied in electronically stored objects or files. If templates are used, the templates can be configured to include any of the foregoing within a generated notification.

For example, a notification can take the form of an e-mail notification sent to one or more users. As discussed above, an e-mail notification could be related to a potential, new, pending, in-process, abandoned, or completed trade. A user may receive an e-mail that includes one or more links, such as a link to a web site of the automated trading system 70'. The link could bring a user to a page in the website where a user input is needed or where information useful to the user is presented, for example. Thus, the link could be a link to a website home page or a deep link to a lower-level page within a website. The e-mail may include embedded executable code that allows the user to provide inputs or otherwise interact with the automated trading system 70' via the user's e-mail interface, as is now known in the arts, or as hereafter becomes developed.

A notification can be presented within a browser or via an Internet connection, for example as a pop-up message or icon, or as an icon or user interface property that changes to indicate that a notification is available. The pop-up message or icon could include a link, as discussed above. For example, if the user has a browser open, a notification could be provided through the browser, even if the browser is not open to the website of the automated trading system 70'. In some embodiments, even if the browser is not open, a notification can be presented via a user interface of the device (e.g., a desktop), so long as a network connection is established. As an example, a cookie (or other program) could run in the background of the device and present notifications via the desktop (or other user interface) when they are received by the device (e.g., PC, PDA, cell phone) from the automated trading system 70'.

In other embodiments, notifications can be in the form of an automated phone message, test message, or instant message. In still other embodiments, notifications can be provided via a cable or satellite TV, if properly configured. In the various embodiments, the notification module is configured to generate a message for transmission via the appropriate network and to the appropriate device, using any known message formats and protocols.

Some examples of notifications that could be provided to a user device are listed below:

EXAMPLE 1

Dear Greg,
We have determined that 7 people have item X from your want list available to trade now.
Click here to view the possible trades.

EXAMPLE 2

Dear Mark,
Someone would like to trade you item X in return for your item A.
Click here to review and accept/reject the proposed trade.

EXAMPLE 3

Dear Greg,
All users in a proposed 4-way trade have agreed to the trade. You will receive item Y in exchange for item B. Please now ship item B to 111 Main Street, Boston, Mass. 11111.
Click here to review trade details.

EXAMPLE 4

Dear Mark,
Someone has rejected the proposed trade, where you would have received item Z for your item E. We have determined a new trade that achieves the same trade for you.
Click here to review and accept/reject the new proposed trade.

The actual content of a notification will depend on the stimulus or stimuli, as discussed above, and the context (i.e., abandoned trade, completed trade, rejected trade, etc.). The above illustrative notifications are trade related, but other types of notifications can be generated. The above notifications could be presented via any known user interface and for any of devices 90, as examples. If the user device receiving the notification is audio enabled (e.g., a phone or computer with speakers), the prompts could be verbal. For example, in a phone context, rather than a "Click here . . . " prompt, the notification could include an audio message, such as "Press # to accept trade, press * to reject trade" or "Press # to speak to an assistant," as examples. If the user device is properly enabled, the notification could include text, video and/or audio.

In an "N-way" trade, notifications can be sent to one or more of the users involved in the N-Way trade. Thus, if the automated trading system determines a 4-way trade, each of the 4 users can receive a notification informing each of the trade and soliciting an acceptance or rejection of the trade. If one user rejects a proposed trade, automated trading system 70 could determine a new N-way trade and inform the new set of users about the proposed new trade, and solicit acceptance or rejection from each. If an N-way trade is accepted by all, then some or all users could receive a notification that the trade has been agreed to. In other cases the notification could indicate that the trade has been rejected, abandoned, or completed. When a trade is accepted by the users involved, each user could receive a notification with instructions for shipping their respective HL item.

While the electronic notification module 84 and database 86 are shown and described with respect to the automated the trading system 70', they could be implemented as part of or interfaced to other type of systems, such as an auction system, reverse auction system, and an order and sales system, or other commerce system, or a combination of the foregoing. As will be appreciated by those skilled in the art, the above electronic notification functionality can be implemented in the form of computer program code executable by one or more computer processors.

Figure 5A:
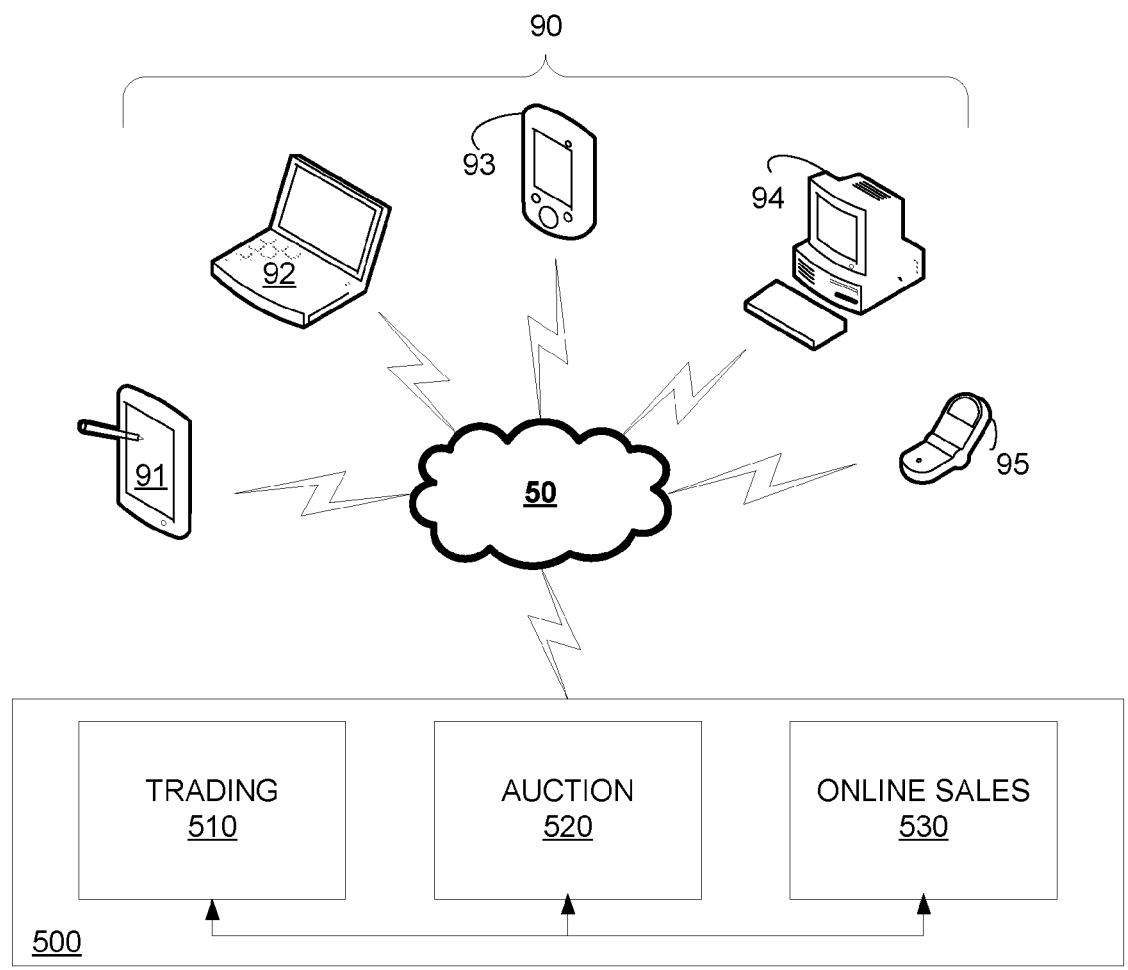
FIGS. 5A-5C illustrate block diagrams of embodiments of a multi-transaction system, in accordance with aspects of the present invention.
Figure 5B:
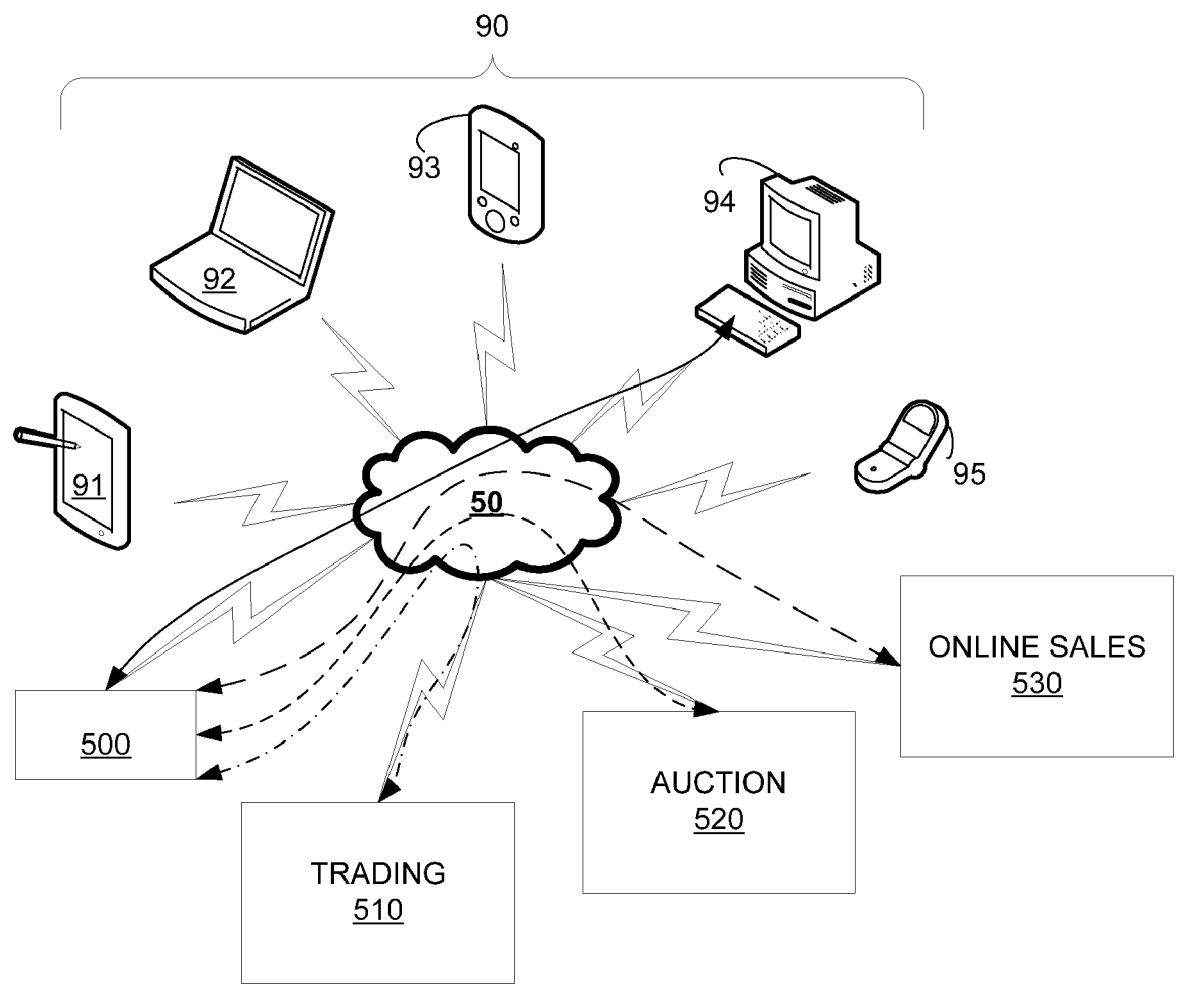
Figure 5C:
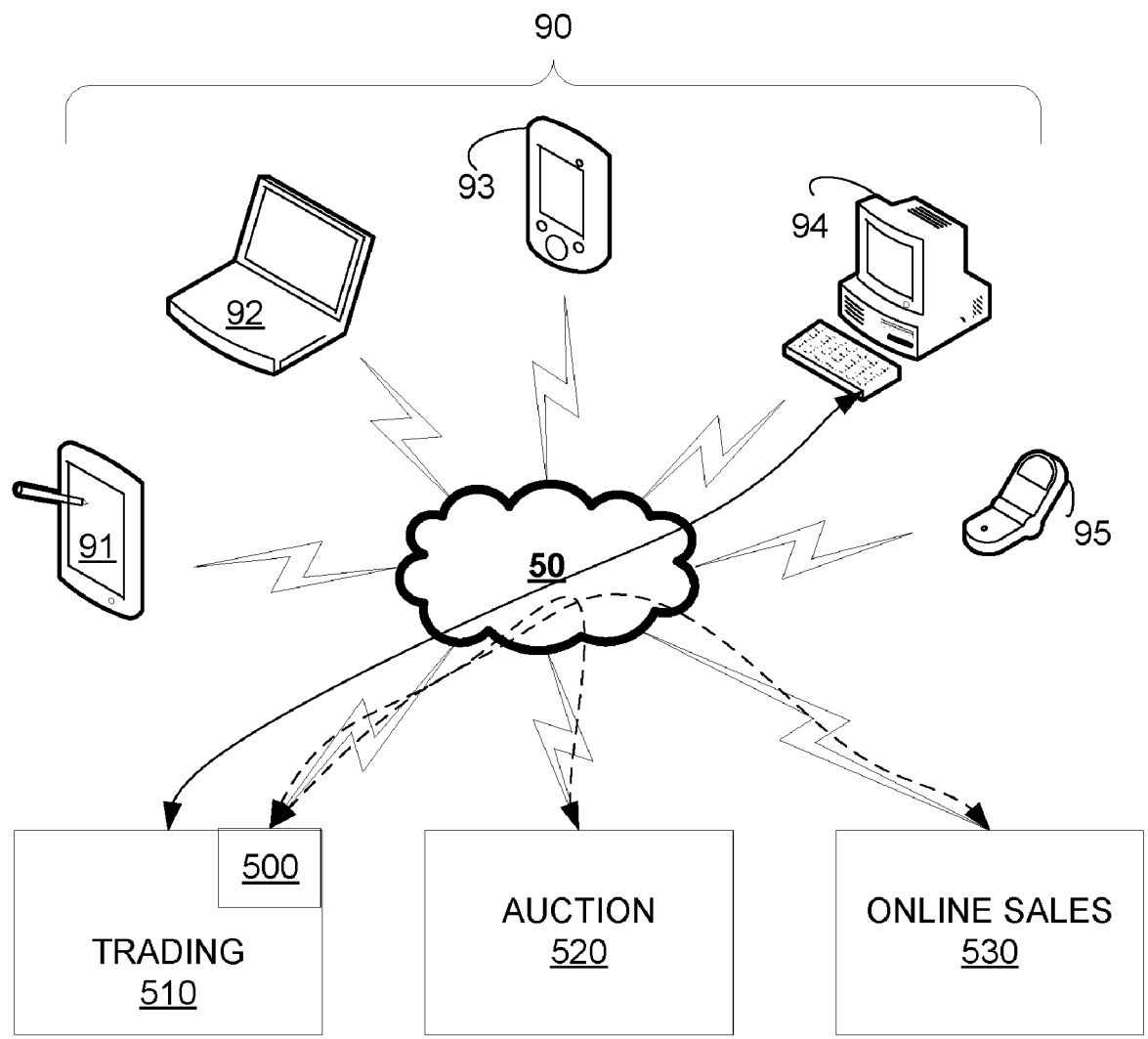

FIGS. 5A-5C show various embodiments of a multi-transaction system 500. Multi-transaction system 500 can be configured to permit a user to acquire one or more items using various transaction systems, such as, for example, sale, auction, and/or trading systems. In particular, multi-transaction system 500 can enable procurement of an item from one of a plurality of systems or subsystems associated with different types of transactions, such as, for example, purchase, trade or auction. Combining two or more of a trading system, an auction system, and an online sales system can provide a user with an integrated transaction system. Such a system can offer a convenient and time-saving approach to acquiring wanted items, while avoiding visiting multiple internet sites to determine acquisition options.

Multi-transaction system 500 can be accessible via any known public or private network, e.g., the Internet, using one or more of a variety of commonly available network enabled user devices. As an example, networking can permit the trading, auction, and/or online sales systems to be collocated or geographically dispersed. Thus, as will be appreciated by those skilled in the art, embodiments of multi-transaction system could take any of a variety of forms, as evident in the illustrative embodiments discussed below with reference to FIGS. 5A-5C.

In the embodiments of FIGS. 5A-5C, such multi-transaction systems can include a trading system 510, such as automated trading system 70 of FIG. 2B or 70' of FIG. 4. Such trading systems can be configured for non-negotiated trades, non-currency trades, N-way trades, and/or real-time trades, as previously described. The item can be any type of tradable item, e.g., a book, recorded music, a movie, a video game, a software program, a collectible item, and so on.

Multi-transaction system 500 can also include an auction system 520, wherein auction system 520 can include any type of auction system, such as an English, reverse, Dutch, silent, sealed, or other suitable type of auction. In addition, system 500 could include an online sales system 530, wherein a user may purchase an item using any suitable payment method, such as, for example, a credit card, or online payment system (e.g. Paypal).

Specifically, FIG. 5A is an illustrative embodiment of multi-transaction system 500. In this embodiment, the trading system 510, auction system 520 and on-line sales system 530 are shown as being one integrated system. In other embodiments, multi-transaction system 500 could include only two of the three systems shown in FIG. 5A. For example, the multi-transaction system 500 could include trading system 510 and on-line sales system 530, with no option to obtain the wanted item in an auction. In other embodiments, if only two of the systems are included within multi-transaction system 500, then system 500 could include a link to another system configured to provide at least some of the functionality and/or data of the omitted system. Continuing with the above example, if multi-transaction system 500 includes trading system 510 and on-line sales system 530, then a link to a third party auction system 520 (e.g., www.eBay.com) could be used to bring the auction functionality and data into multi-transaction system 500.

System 500 can be accessible via network 50 by users using any of a variety of types of user devices 90. For example, a user operating personal computer 94 could access multi-transaction system 500 via the Internet and acquire a wanted item by trading for it using trading system 510, bidding on it using auction system 520, and/or buying it (new or used) via on-line sales system 530. Multi-transaction system 500 can be configured to generate a graphical user interface display for presentation on personal computer 94 that provides such user-interactive options. Generally, system 500 may provide information to a user using any suitable communication operable with a particular user device 90.

FIG. 5B shows an alternative form of multi-transaction system 500. In this form, multi-transaction system 500 is a standalone system that provides a user with accesses to two or more of trading system 510, auction system 520, and online sales system 530. These various transaction systems can be accessed via the Internet for the trading, buying and selling of one or more items. For example, system 500 could access a system or database containing trade-related data associated with a user from one database and sale-related data associated with an item from another system and/or database. Further, various transaction systems, e.g., sales, auction, and trading, can be open for general public access or restricted for private access. Such systems can be connected via any one or more communication channels, links and/or methods known in the art.

In FIG. 5B, the solid double arrowhead line represents the user's interaction with the multi-transaction system 500 to obtain a wanted item, which can include a search for that item. In response to the user interaction, multi-transaction system 500 can access the appropriate external transaction systems to obtain the required information to satisfy the user's request for the item. The dashed double arrowhead lines in FIG. 5B represent such interactions, whereby system 500 can transmit and/or receive signals to independently operating transaction systems, such as trading system 510, auction system 520, and online sales system 530 (or a subset thereof).

In such a case, multi-transaction system 500 can serve as a "front-end" for a user accessing multiple transaction systems. In doing so, system 500 can include functionality that generates displays related to the wanted item that can be populated with information and data from the externally accessed trading system 510, auction system 520, and online sales system 530. Consequently, multi-transaction system 500 can provide a single, integrated user interface from which a user can access and interact with two or more of automated trading system 510, auction system 520, and online sales system 530. As described below, system 500 can include automated search and data retrieval functions to permit efficient comparison between various transaction opportunities.

In FIG. 5C, the multi-transaction system 500 is shown as a subsystem or module within trading system 510. In such an embodiment, trading system 510 functions as a trading system with multi-transaction system capability, provided via multi-transaction subsystem 500. In other embodiments, multi-transaction system 500 could be a subsystem or module to one or more of auction system 520 and/or online sales system 530. For example, as with FIG. 2B, the solid double arrowhead line indicates the user's interaction with multi-transaction system trading system 500 and the dashed double arrowhead lines represent the communication among the systems.

Thus, in some embodiments, multi-transaction system 500 can appear as one system to the user with available capabilities from a combination of transaction systems, e.g., two or more of automated trading system 510, auction system 520, and online sales system 530, as in FIGS. 5A and 5B. Yet in other embodiments, one of automated trading system 510, auction system 520, and online sales system 530 can be a primary system and the other systems can be complimentary systems, as in FIG. 5C. For example, a user can access auction system 520 and can also be provided relevant transaction information from automated trading system 510 or online sales system 530, or both, regarding alternative options for procuring the item or other items from the complimentary systems. The transaction information can include one or more of text, graphics, video, audio, web page links and executable program code, as examples.

Figure 6:
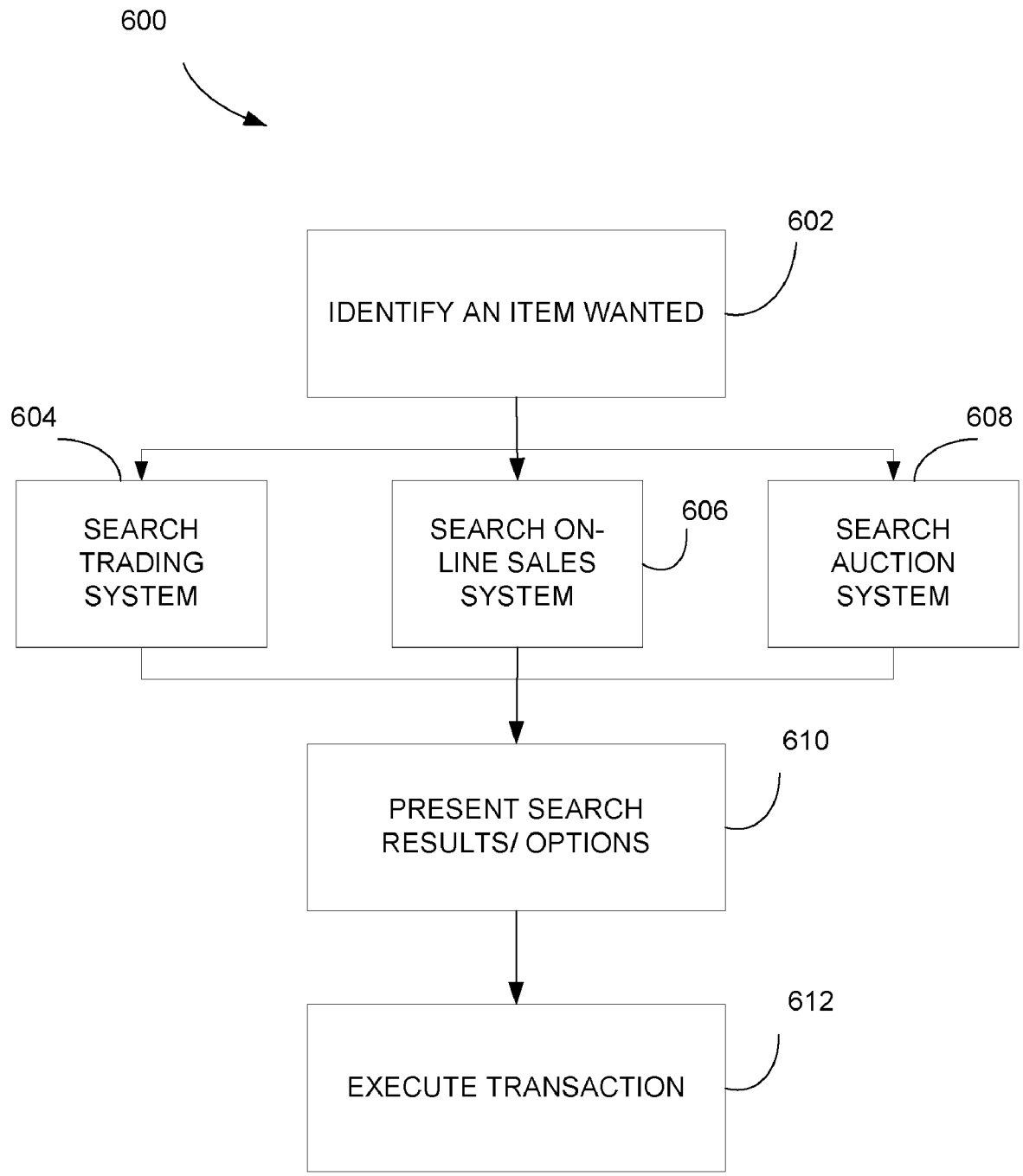
FIG. 6 illustrates a flowchart depicting an embodiment of a method of conducting a transaction with a multi-transaction system, as provide in FIGS. 5A-5C.

FIG. 6 is a flowchart depicting an embodiment of a method 600 for conducting a transaction using a multi-transaction system, such as those shown in FIGS. 5A-5C. In any of the above embodiments, a user could access multi-transaction system 500 via network 50, e.g., using a personal computer 94. The multi-transaction system can include a user interface module, as previously described, that generates or prepares information for presentation via an interactive user interface, and which processes received information input by the user. The user interface module can generate a variety of mechanisms to facilitate user selection and data entry, output of transaction information, and user interaction with system functionality, e.g., free text input fields, menus, images, audio output, voice activated input, links and so on. As a first step 602, the user can input or identify the item wanted within multi-transaction system using traditional input and search mechanisms.

As is shown in steps 604, 606, and 608, system 500 could be configured to search for the identified item in each or a plurality of trading system 510, auction system 520, and/or online sales system 530. If all three of these systems are not included in the multi-transaction system, then the appropriate search step would be omitted. Searching for an item in steps 604, 606, and 608 can be performed using a variety of methods, e.g., by direct access to one or more transaction system from the set of transaction systems 510, 520, and 530. Multi-transaction system 500 could also be configured for "web crawling" or other similar function to access and retrieve information from external systems, e.g., web-based, systems via the Internet and World Wide Web.

In step 610 the search results and options are provided to the user via, for example, a web browser graphical user interface. For example, system 500 could return results informing the user that *The Da Vinci Code* is available through trade on one or more automated trading systems 510 (e.g., www.swaptree.com), via an auction on one or more auction systems 520 (e.g., www.ebay.com) and/or for sale through one or more online sales systems (e.g., www.amazon.com). The item could be designated as being new or used in each case. If used, information concerning the age, version, condition, and so on could also be provided.

For example, if the desired item is *The Da Vinci Code* book, system 500 could return and present the following transaction information:

ITEM: *The Da Vinci Code* by Dan Brown (Hardcover)
Buy new for: $24.99 (click here)
Buy used for: $9.99 in good condition (click here)
Bid on it: Current Bid: $2.00 (click here)
Get it in Trade for your: Godfather movie, Simon & Garfunkel—Greatest Hits CD, . . . (click here)

The above comparative output, or the like, could be presented via a web browser, electronic notification (e.g., an e-mail), and/or suitable audio interface configured to operate with a phone.

Having been presented with the relevant transaction information, the user could be presented with options to execute a transaction, as shown in step 612 of FIG. 6. In the above example, the "(click here)" item represents a mechanism (or link) to transition the user to a new page, set of functionality, web site or system configured to facilitate the indicated transaction, e.g., buy, bid on, or trade for the item. As will be appreciated, other mechanisms could additionally or alternatively be provided to prompt the user to take action or to redirect the user to another page, site or system configured to facilitate the transaction.

The multi-transaction system can be configured to present options that are favorable to the user, from a plurality of possible options, by using filtering or sorting mechanisms. The filtering or sorting mechanisms could use filtering or sorting parameters, which could be defaults established by the system, user selectable, or some combination thereof.

For example, there can be a parameter for an item condition, and the user can be given the option to set it to New, Used, or New or Used. Setting the condition parameter to New causes the multi-transaction system to filter out all matches of the wanted item in Used condition. If the user selected "used," then the system could allow the user to select from more refined parameters relating to used condition, such as: Excellent Condition, Good Condition, Fair Condition, or Poor Condition. For example, selecting Used and Good, can filter out all New items and all Used item in Fair or Poor condition, but items in Excellent and Good condition could be presented.

In some embodiments the parameter can be associated with the user. That is, if users are rated based on past performance, those ratings could be used as parameters for filtering. For example, the user may choose to only deal with "Power Users," e.g., users with usage and ratings above certain threshold values—such as having a positive feedback of 95% or above. Also, a form of filtering functionality could be applied wherein the user could be given options to select from a subset among the trading system, on-line sales system, auction system, and/or other transaction systems. In other embodiments, the user can select to transact with users from a specified geographical location, one or more particular institutions, within a certain age range or other selection criteria.

The multi-transaction system can include other features to provide the most attractive alternatives to a user. For example, if the multi-transaction system searches the Web and finds ten sites all offering the same item in new condition, the multi-transaction system can be configured to present a link to the site offering the item for the lowest price. The same can be done across auction sites. The multi-transaction system can be configured to return information from, and a link to, a Web site having the lowest bid for the item or having the least time left in the auction, among a set of auction systems having the item on auction.

In a trade context, the system can be configured to return a list of one or more preferred trade partners. The system could also be configured to determine a preferred trade partner, such as a person that has a history of honoring his trade obligations (e.g., has a high ranking or positive feedback rating); is willing to trade for an item that has been on the user's HL for a long time; or is geographically close to the user, as examples.

In other embodiments, the multi-transaction system could be configured to return results with preference to certain web sites. For example, if Amazon.com has a preferred vendor or source status, then the multi-transaction system can be configured to present prices from the www.amazon.com website, if the item is available through that web site. Similar preferred vendors or sources could be established for each type of system, and for more than one vendors or sources of each type of system.

In various embodiments of the multi-transaction system, a notification module, such as notification module 84 of FIG. 4, can be included to provide electronic notifications to one or more of the user devices 90. Such electronic notifications can include transaction related notifications, such as those described with respect to FIG. 4. As such, the electronic notifications can take any of a variety of forms, and can include one or more types of information, data, objects, links, and code. Such electronic notifications can include e-mails, instant messages, automated telephone calls and the like.

While the foregoing has described what are considered to be the best mode and/or other preferred embodiments, it is understood that various modifications can be made therein and that the invention or inventions can be implemented in various forms and embodiments, and that they can be applied in numerous applications, only some of which have been described herein. It is intended by the following claims to claim that which is literally described and all equivalents thereto, including all modifications and variations that fall within the scope of each claim.

What is claimed is:

1. A multi-transaction system, comprising:
a transaction module configured to access a set of transaction systems to obtain transaction information to enable procurement of a want item by a first user, wherein the set of transaction systems includes:
an automated trading system configured to determine a non-currency, non-negotiated exchange of items that have approximately the same trade value, without evaluating price, value, or credits associated with the items, whereby the first user would receive the want item and give up a have item; where the want item is identified as a have item of a second user,
wherein set of transaction systems further includes at least one of:
an auction system configured to enable the user to electronically bid on the item; and
an online sales system configured to enable the user to purchase the item.

2. The system of claim 1, wherein the automated trading system is also configured to access a have list and a want list of each of a plurality of users, including the first and the second users, and the want item is on a want list of the first user and a have list of the second user.

3. The system of claim 1, wherein the automated trading system is configured to determine an N-way trade and N is greater than two.

4. The system of claim 1, wherein the automated trading system is configured to determine the trade in real-time.

5. The system of claim 1, wherein the automated trading system comprises:
a storage system configured to store a set of data representing a plurality of users and a plurality of tradable items associated with the plurality of users;
a trade module configured to access the storage system and determine at least one trade among at least two users from the plurality of users, wherein the trade is determined based on a set of have items and a set of want items associated with each of the at least two users; and
an interface configured to couple to the trade module and to transmit a signal representing at least a portion of the trade.

6. The system of claim 5, further comprising:
a notification module configured to selectively generate and transmit an electronic notification to a user device, wherein the electronic notification includes at least some of the transaction information.

7. The system of claim 1, wherein the item is a type of tradable item from a group comprising a book, recorded music, a movie, a video game, a software program, and a collectible item.

8. The system of claim 1, further comprising a user interface module configured to present, via a user device, at least some of the transaction information.

9. The system of claim 8, wherein the user interface module is configured to prepare at least some of the transaction information as comparative transaction information from at least two transaction systems from the set of transaction systems.

10. The system of claim 8, wherein the user interface module is configured to present mechanisms to execute a transaction with at least one of the automated trading system, the auction system, and the online sales system.

11. The system of claim 1, wherein the set of transaction systems are independent systems that are remote to each other and the transaction module is configured to couple the set of transaction systems to the user device via at least one network to provide the transaction information.

12. The system of claim 1, further comprising a filtering module configured to filter the transaction information based on one or more filtering parameters to determine a subset of transactions selectable from the set of transaction systems.

13. The system of claim 12, wherein the filtering parameters include user-related filtering parameters configured to determine a trade, auction or sale transaction partner based on a user rating.

14. The system of claim 1, wherein the transaction module is further configured to select a transaction partner for one or more of the trading system, the auction system and the online sales system from a set of preferred transaction partners.

15. The system of claim 1, wherein the transaction information includes one or more of text, graphics, video, audio, web page links, and executable computer code.

16. The system of claim 1, further comprising:
a set of network interfaces configured to couple the transaction module to at least one transaction system in the set of transaction systems.

17. The system of claim 16, wherein the set of network interfaces includes an interface to the World Wide Web.

18. A method of enabling procurement of an item using multiple types of transaction systems, the method including steps carried out by at least one computer processor accessing at least one storage media and comprising:
a computer receiving an electronic request for procurement of a want item by a first user;
in response to the electronic request, accessing a set of transaction systems to obtain transaction information enabling procurement of the want item, the set of transaction systems including:
1) an automated trading system configured to determine a non-currency, non-negotiated exchange of items that have approximately the same trade value, without evaluating price, value, or credits associated with the items, whereby the first user would receive the want item and give up a have item, where the want item is identified as a have item of a second user, the set of transaction systems further including at least one of:
2) an auction system configured to enable the user to electronically bid on the item; and
3) an online sales system configured to enable the user to purchase the item; and
providing the transaction information via a wired or wireless network to a user device configured to procure the item from at least one transaction system selected from the set of transaction systems.

19. The method of claim 18, wherein the automated trading system accesses a have list and a want list of each of a plurality of users, including the first and the second users, and the want item is on a want list of the first user and a have list of the second user.

20. The method of claim 18, wherein the automated trading system is configured to determine an N-way trade and N is greater than two.

21. The method of claim 18, wherein the automated trading system is configured to determine the trade in real-time.

22. The method of claim 18, wherein the automated trading system is configured for:
storing in a storage system a set of data representing a plurality of users and a plurality of tradable items associated with the plurality of users;
accessing the storage system and determining at least one trade among at least two users from the plurality of users, wherein the trade is determined based on a set of have items and a set of want items associated with each of the at least two users; and
transmitting a signal representing at least a portion of the trade.

23. The method of claim 18, wherein the item is a type of tradable item from a group comprising a book, recorded music, a movie, a video game, a software program, and a collectible item.

24. The method of claim 18, wherein providing the transaction information further includes providing at least some of the transaction information for graphic presentation on the user device.

25. The method of claim 18, further including:
presenting user interface mechanisms configured to execute a transaction with at least one of the automated trading system, the auction system, and the online sales system.

26. The method of claim 18, wherein providing the transaction information further includes presenting at least some of the transaction information as comparative transaction information from at least two transaction systems selected from the set of transaction systems.

27. The method of claim 18, further including determining a set of transactions favorable to the user by filtering the transaction information using one or more filtering parameters.

28. The method of claim 27, wherein the one or more filtering parameters include user-related filtering parameters configured to determine a transaction partner based on a user rating of the transaction partner.

29. The method of claim 18, wherein the transaction information includes one or more of text, graphics, video, audio, web page links, and executable computer code.

30. The method of claim 18, further including:
selecting a transaction partner for one or more of the trading system, the auction system and the online sales system from a set of preferred transaction partners.

31. The method of claim 18, wherein the set of transaction systems are independent systems that are remote to each other and the method further includes:
coupling the set of transaction systems to the user device via at least one network to provide the transaction information.

32. The method of claim 31, wherein the at least one network includes the World Wide Web.

33. The method of claim 31, further including selectively generating and sending to the user device, via the at least one network, an electronic notification comprising at least some of the transaction information.

34. A computer program product including a computer readable medium having stored thereon computer executable instructions for performing a method comprising:
   A. accessing a set of transaction systems to obtain transaction information enabling procurement of a want item by a first user, the set of transaction systems including:
      1) an automated trading system configured to determine a non-currency, non-negotiated exchange of items that have approximately the same trade value, without evaluating price, value, or credits associated with the items, whereby the first user would receive the want item and give up a have item, where the want item is identified as a have item of a second user,
      the set of transaction systems further including one or more of:
      2) an online sales system configured to enable the user to purchase the item; and
      3) an auction system configured to enable the user to electronically bid on the item; and
   B. providing the transaction information to a user device configured to procure the item from at least one transaction system selected from the set of transaction systems.

35. The computer program product of claim 34, wherein the automated trading system accesses a have list and a want list of each of a plurality of users, including the first and the second users, and the want item is on a want list of the first user and a have list of the second user.

36. The computer program product of claim 34, wherein the automated trading system is configured to determine an N-way trade and N is greater than two.

37. The computer program product of claim 34, wherein the automated trading system is configured to determine the trade in real-time.

38. The computer program product of claim 34, wherein the method further includes selectively generating and sending to the user device an electronic notification comprising at least some of the transaction information.

39. The computer program product of claim 38, wherein the electronic notification is an e-mail that includes mechanisms for procuring the item from at least one of the transaction systems.

40. The computer program product of claim 39, wherein the mechanisms include a link to a web site configured to conduct a transaction to procure the item.

41. The computer program product of claim 34, wherein the item is a type of tradable item from a group comprising a book, recorded music, a movie, a video game, a software program, and a collectible item.

42. The computer program product of claim 34, wherein providing the transaction information further includes providing at least some of the transaction information for graphic presentation on the user device.

43. The computer program product of claim 34, wherein the method further includes:
   C. presenting user interface mechanisms configured to execute a transaction with at least one of the automated trading system, the auction system, and the online sales system.

44. The computer program product of claim 34, wherein part B further includes presenting the at least some of the transaction information as comparative transaction information from at least two transaction systems selected from the set of transaction systems.

45. The computer program product of claim 34, the method further including determining a set of transactions favorable to the user by filtering the transaction information using one or more filtering parameters.

46. The computer program product of claim 45, wherein the one or more filtering parameters includes user-related filtering parameters configured to determine a transaction partner based on a user rating of the transaction partner.

47. The computer program product of claim 34, wherein the transaction information includes one or more of text, graphics, video, audio, web page links, and executable computer code.

48. The computer program product of claim 34, the method further including:
   C. selecting a transaction partner for one or more of the trading system, the auction system and the online sales system from a set of preferred transaction partners.

49. The computer program product of claim 34, wherein the set of transaction systems are independent systems that are remote to each other and the method further includes:
   C. coupling the set of transaction systems to the user device via at least one network to provide the transaction information.

50. The computer program product of claim 49, wherein the at least one network includes the World Wide Web.

* * * * *